(12) United States Patent
Vollenweider et al.

(10) Patent No.: US 11,226,348 B2
(45) Date of Patent: Jan. 18, 2022

(54) STORAGE MODULE, METHOD OF OPERATING A LABORATORY AUTOMATION SYSTEM AND LABORATORY AUTOMATION SYSTEM

(71) Applicant: Roche Diagnostics Operations, Inc., Indianapolis, IN (US)

(72) Inventors: Urs Vollenweider, Waedenswil (CH); Gottlieb Schacher, Kriens (CH); Goran Savatic, Cham (CH); Marco Maetzler, Belmont, CA (US); Christoph Ludwig, Rotkeuz (CH); Christian Loewenstein, Zurich (CH); Yves Laloux, Cham (CH); Rik Harbers, Cham (CH); Matthias Edelmann, Fellbach (DE); Andreas Drechsler, Baar (CH)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 221 days.

(21) Appl. No.: 15/843,867

(22) Filed: Dec. 15, 2017

(65) Prior Publication Data

US 2018/0106821 A1    Apr. 19, 2018

Related U.S. Application Data

(63) Continuation of application No. PCT/EP2016/065605, filed on Jul. 1, 2016.

(30) Foreign Application Priority Data

Jul. 2, 2015  (EP) ................................. 15175101

(51) Int. Cl.
*G01N 35/04*   (2006.01)

(52) U.S. Cl.
CPC ..... *G01N 35/04* (2013.01); *G01N 2035/0406* (2013.01); *G01N 2035/0477* (2013.01); *G01N 2035/0498* (2013.01)

(58) Field of Classification Search
None
See application file for complete search history.

(56) References Cited

U.S. PATENT DOCUMENTS

| 3,273,727 A | 9/1966 | Rogers et al. |
| 3,653,485 A | 4/1972 | Donlon |

(Continued)

FOREIGN PATENT DOCUMENTS

| CN | 201045617 Y | 4/2008 |
| CN | 102109530 A | 6/2011 |

(Continued)

OTHER PUBLICATIONS

International Search Report dated Sep. 29, 2016, in Application No. PCT/EP2016/065605, 5 pages.

*Primary Examiner* — Kathryn Wright
(74) *Attorney, Agent, or Firm* — Roche Diagnostics Operations, Inc.

(57) ABSTRACT

A storage module for a laboratory automation system, a method of operating a laboratory automation system, and a laboratory automation system are presented. Items used by laboratory stations are stored centrally in a storage module and can be transported to the laboratory stations using a laboratory sample distribution system.

6 Claims, 2 Drawing Sheets

(56) References Cited

U.S. PATENT DOCUMENTS

| | | |
|---|---|---|
| 3,901,656 A | 8/1975 | Durkos et al. |
| 4,150,666 A | 4/1979 | Brush |
| 4,395,164 A | 7/1983 | Beltrop et al. |
| 4,544,068 A | 10/1985 | Cohen |
| 4,771,237 A | 9/1988 | Daley |
| 5,120,506 A | 6/1992 | Saito et al. |
| 5,295,570 A | 3/1994 | Grecksch et al. |
| 5,309,049 A | 5/1994 | Kawada et al. |
| 5,351,801 A | 10/1994 | Markin et al. |
| 5,457,368 A | 10/1995 | Jacobsen et al. |
| 5,523,131 A | 6/1996 | Isaacs et al. |
| 5,530,345 A | 6/1996 | Murari et al. |
| 5,636,548 A | 6/1997 | Dunn et al. |
| 5,641,054 A | 6/1997 | Mori et al. |
| 5,651,941 A | 7/1997 | Stark et al. |
| 5,720,377 A | 2/1998 | Lapeus et al. |
| 5,735,387 A | 4/1998 | Polaniec et al. |
| 5,788,929 A | 8/1998 | Nesti |
| 6,045,319 A | 4/2000 | Uchida et al. |
| 6,062,398 A | 5/2000 | Thalmayr |
| 6,141,602 A | 10/2000 | Igarashi et al. |
| 6,151,535 A | 11/2000 | Ehlers |
| 6,184,596 B1 | 2/2001 | Ohzeki |
| 6,191,507 B1 | 2/2001 | Peltier et al. |
| 6,206,176 B1 | 3/2001 | Blonigen et al. |
| 6,255,614 B1 | 7/2001 | Yamakawa et al. |
| 6,260,360 B1 | 7/2001 | Wheeler |
| 6,279,728 B1 | 8/2001 | Jung et al. |
| 6,293,750 B1 | 9/2001 | Cohen et al. |
| 6,429,016 B1 | 8/2002 | McNeil |
| 6,444,171 B1 | 9/2002 | Sakazume et al. |
| 6,571,934 B1 | 6/2003 | Thompson et al. |
| 6,579,717 B1 | 6/2003 | Matsubara et al. |
| 7,028,831 B2 | 4/2006 | Veiner |
| 7,078,082 B2 | 7/2006 | Adams |
| 7,122,158 B2 | 10/2006 | Itoh |
| 7,278,532 B2 | 10/2007 | Martin |
| 7,326,565 B2 | 2/2008 | Yokoi et al. |
| 7,425,305 B2 | 9/2008 | Itoh |
| 7,428,957 B2 | 9/2008 | Schaefer |
| 7,578,383 B2 | 8/2009 | Itoh |
| 7,597,187 B2 | 10/2009 | Bausenwein et al. |
| 7,850,914 B2 | 12/2010 | Veiner et al. |
| 7,858,033 B2 | 12/2010 | Itoh |
| 7,875,254 B2 | 1/2011 | Garton et al. |
| 7,939,484 B1 | 5/2011 | Loeffler et al. |
| 8,240,460 B1 | 8/2012 | Bleau et al. |
| 8,281,888 B2 | 10/2012 | Bergmann |
| 8,502,422 B2 | 8/2013 | Lykkegaard |
| 8,796,186 B2 | 8/2014 | Shirazi |
| 8,833,544 B2 | 9/2014 | Stoeckle et al. |
| 8,973,736 B2 | 3/2015 | Johns et al. |
| 9,056,720 B2 | 6/2015 | Van De Loecht et al. |
| 9,097,691 B2 | 8/2015 | Onizawa et al. |
| 9,187,268 B2 | 11/2015 | Denninger et al. |
| 9,211,543 B2 | 12/2015 | Ohga et al. |
| 9,239,335 B2 | 1/2016 | Heise et al. |
| 9,423,410 B2 | 8/2016 | Buehr |
| 9,423,411 B2 | 8/2016 | Riether |
| 9,567,167 B2 | 2/2017 | Sinz |
| 9,575,086 B2 | 2/2017 | Heise et al. |
| 9,593,970 B2 | 3/2017 | Sinz |
| 9,598,243 B2 | 3/2017 | Denninger et al. |
| 9,618,525 B2 | 4/2017 | Malinowski et al. |
| 9,658,241 B2 | 5/2017 | Riether et al. |
| 9,664,703 B2 | 5/2017 | Heise et al. |
| 9,772,342 B2 | 9/2017 | Riether |
| 9,791,468 B2 | 10/2017 | Riether et al. |
| 9,810,706 B2 | 11/2017 | Riether et al. |
| 10,288,634 B2 | 5/2019 | Kaeppeli |
| 2002/0009391 A1 | 1/2002 | Marquiss et al. |
| 2003/0092185 A1 | 5/2003 | Qureshi et al. |
| 2004/0050836 A1 | 3/2004 | Nesbitt et al. |
| 2004/0084531 A1 | 5/2004 | Itoh |
| 2005/0061622 A1 | 3/2005 | Martin |
| 2005/0109580 A1 | 5/2005 | Thompson |
| 2005/0194333 A1 | 9/2005 | Veiner et al. |
| 2005/0196320 A1 | 9/2005 | Veiner et al. |
| 2005/0226770 A1 | 10/2005 | Allen et al. |
| 2005/0242963 A1 | 11/2005 | Oldham et al. |
| 2005/0247790 A1 | 11/2005 | Itoh |
| 2005/0260101 A1 | 11/2005 | Nauck et al. |
| 2005/0260102 A1 | 11/2005 | Angelantoni et al. |
| 2005/0271555 A1 | 12/2005 | Itoh |
| 2006/0000296 A1 | 1/2006 | Salter |
| 2006/0047303 A1 | 3/2006 | Ortiz et al. |
| 2006/0219524 A1 | 10/2006 | Kelly et al. |
| 2007/0116611 A1 | 5/2007 | DeMarco |
| 2007/0210090 A1 | 9/2007 | Sixt et al. |
| 2007/0248496 A1 | 10/2007 | Bondioli et al. |
| 2007/0276558 A1 | 11/2007 | Kim |
| 2008/0012511 A1 | 1/2008 | Ono |
| 2008/0029368 A1 | 2/2008 | Komori |
| 2008/0056328 A1 | 3/2008 | Rund et al. |
| 2008/0131961 A1 | 6/2008 | Crees et al. |
| 2009/0004732 A1 | 1/2009 | LaBarre et al. |
| 2009/0022625 A1 | 1/2009 | Lee et al. |
| 2009/0081771 A1 | 3/2009 | Breidford et al. |
| 2009/0117620 A1* | 5/2009 | Fritchie .............. B01L 3/5085 |
| | | 435/91.1 |
| 2009/0128139 A1 | 5/2009 | Drenth et al. |
| 2009/0142844 A1 | 6/2009 | Le Comte |
| 2009/0180931 A1 | 7/2009 | Silbert et al. |
| 2009/0322486 A1 | 12/2009 | Gerstel |
| 2010/0000250 A1 | 1/2010 | Sixt |
| 2010/0152895 A1 | 6/2010 | Dai |
| 2010/0175943 A1 | 7/2010 | Bergmann |
| 2010/0186618 A1 | 7/2010 | King et al. |
| 2010/0255529 A1 | 10/2010 | Cocola et al. |
| 2010/0300831 A1 | 12/2010 | Pedrazzini |
| 2010/0312379 A1 | 12/2010 | Pedrazzini |
| 2010/0324722 A1 | 12/2010 | Fritchie et al. |
| 2011/0050213 A1 | 3/2011 | Furukawa |
| 2011/0124038 A1 | 5/2011 | Bishop et al. |
| 2011/0172128 A1 | 7/2011 | Davies et al. |
| 2011/0186406 A1 | 8/2011 | Kraus et al. |
| 2011/0287447 A1 | 11/2011 | Norderhaug et al. |
| 2012/0037696 A1 | 2/2012 | Lavi |
| 2012/0129673 A1 | 5/2012 | Fukugaki et al. |
| 2012/0178170 A1 | 7/2012 | Van Praet |
| 2012/0211645 A1 | 8/2012 | Tullo et al. |
| 2012/0275885 A1 | 11/2012 | Furrer et al. |
| 2012/0282683 A1 | 11/2012 | Mototsu |
| 2012/0295358 A1 | 11/2012 | Ariff et al. |
| 2012/0310401 A1 | 12/2012 | Shah |
| 2013/0034410 A1* | 2/2013 | Heise .................. B65G 54/02 |
| | | 414/222.13 |
| 2013/0153677 A1 | 6/2013 | Leen et al. |
| 2013/0180824 A1 | 7/2013 | Kleinikkink et al. |
| 2013/0263622 A1 | 10/2013 | Mullen et al. |
| 2013/0322992 A1 | 12/2013 | Pedrazzini |
| 2014/0170023 A1 | 6/2014 | Saito et al. |
| 2014/0234949 A1 | 8/2014 | Wasson et al. |
| 2015/0014125 A1 | 1/2015 | Hecht |
| 2015/0140668 A1 | 5/2015 | Mellars et al. |
| 2015/0166265 A1 | 6/2015 | Pollack et al. |
| 2015/0241457 A1 | 8/2015 | Miller |
| 2015/0273468 A1 | 10/2015 | Croquette et al. |
| 2015/0273691 A1 | 10/2015 | Pollack |
| 2015/0276639 A1 | 10/2015 | Spath et al. |
| 2015/0276775 A1 | 10/2015 | Mellars et al. |
| 2015/0276782 A1 | 10/2015 | Riether |
| 2016/0003859 A1 | 1/2016 | Wenczel et al. |
| 2016/0025756 A1 | 1/2016 | Pollack et al. |
| 2016/0054341 A1 | 2/2016 | Edelmann |
| 2016/0077120 A1 | 3/2016 | Riether |
| 2016/0229565 A1 | 8/2016 | Margner |
| 2016/0274137 A1 | 9/2016 | Baer |
| 2016/0282378 A1 | 9/2016 | Malinowski et al. |
| 2016/0341750 A1 | 11/2016 | Sinz et al. |
| 2016/0341751 A1 | 11/2016 | Huber et al. |
| 2017/0059599 A1 | 3/2017 | Riether |
| 2017/0096307 A1 | 4/2017 | Mahmudimanesh et al. |
| 2017/0097372 A1 | 4/2017 | Heise et al. |

(56) References Cited

U.S. PATENT DOCUMENTS

| | | |
|---|---|---|
| 2017/0101277 A1 | 4/2017 | Malinowski |
| 2017/0108522 A1 | 4/2017 | Baer |
| 2017/0131307 A1 | 5/2017 | Pedain |
| 2017/0131309 A1 | 5/2017 | Pedain |
| 2017/0131310 A1 | 5/2017 | Volz et al. |
| 2017/0138971 A1 | 5/2017 | Heise et al. |
| 2017/0160299 A1 | 6/2017 | Schneider et al. |
| 2017/0168079 A1 | 6/2017 | Sinz |
| 2017/0174448 A1 | 6/2017 | Sinz |
| 2017/0184622 A1 | 6/2017 | Sinz et al. |
| 2017/0248623 A1 | 8/2017 | Kaeppeli et al. |
| 2017/0248624 A1 | 8/2017 | Kaeppeli et al. |
| 2017/0363608 A1 | 12/2017 | Sinz |
| 2018/0067141 A1 | 3/2018 | Mahmudimanesh et al. |
| 2018/0074087 A1 | 3/2018 | Heise et al. |
| 2018/0128848 A1 | 5/2018 | Schneider et al. |
| 2018/0156835 A1 | 6/2018 | Hassan |
| 2018/0188280 A1 | 7/2018 | Malinowski |
| 2018/0210000 A1 | 7/2018 | van Mierlo |
| 2018/0210001 A1 | 7/2018 | Reza |
| 2018/0217174 A1 | 8/2018 | Malinowski |
| 2018/0217176 A1 | 8/2018 | Sinz et al. |
| 2018/0224476 A1 | 8/2018 | Birrer et al. |
| 2018/0340951 A1 | 11/2018 | Kaeppell |
| 2018/0340952 A1 | 11/2018 | Kaeppeli et al. |
| 2018/0348244 A1 | 12/2018 | Ren |
| 2018/0348245 A1 | 12/2018 | Schneider et al. |
| 2019/0018027 A1 | 1/2019 | Hoehnel |
| 2019/0076845 A1 | 3/2019 | Huber et al. |
| 2019/0076846 A1 | 3/2019 | Durco et al. |
| 2019/0086433 A1 | 3/2019 | Hermann et al. |
| 2019/0094251 A1 | 3/2019 | Malinowski |
| 2019/0094252 A1 | 3/2019 | Waser et al. |
| 2019/0101468 A1 | 4/2019 | Haldar |
| 2019/0285660 A1 | 9/2019 | Kopp et al. |

FOREIGN PATENT DOCUMENTS

| | | |
|---|---|---|
| DE | 3909786 A1 | 9/1990 |
| DE | 102012000665 A1 | 8/2012 |
| DE | 102011090044 A1 | 7/2013 |
| EP | 0601213 A1 | 10/1992 |
| EP | 0301583 B1 | 4/1994 |
| EP | 0775650 A1 | 5/1997 |
| EP | 0916406 A2 | 5/1999 |
| EP | 1122194 A1 | 8/2001 |
| EP | 1524525 A1 | 4/2005 |
| EP | 2119643 A1 | 11/2009 |
| EP | 2148117 A1 | 1/2010 |
| EP | 2327646 A1 | 6/2011 |
| EP | 2447701 A2 | 5/2012 |
| EP | 2500871 A1 | 9/2012 |
| EP | 2502675 B1 | 2/2014 |
| EP | 2887071 A1 | 6/2015 |
| GB | 2165515 A | 4/1986 |
| JP | S56-147209 A | 11/1981 |
| JP | 60-223481 A | 11/1985 |
| JP | 61-081323 A | 4/1986 |
| JP | S61-069604 A | 4/1986 |
| JP | S61-094925 A | 5/1986 |
| JP | S61-174031 A | 8/1986 |
| JP | S61-217434 A | 9/1986 |
| JP | S62-100161 A | 5/1987 |
| JP | S63-31918 A | 2/1988 |
| JP | S63-48169 A | 2/1988 |
| JP | S63-82433 U | 5/1988 |
| JP | S63-290101 A | 11/1988 |
| JP | 1148966 A | 6/1989 |
| JP | H01-266860 A | 10/1989 |
| JP | H02-87903 A | 3/1990 |
| JP | 03-112393 A | 5/1991 |
| JP | 03-192013 A | 8/1991 |
| JP | H03-38704 Y2 | 8/1991 |
| JP | H04-43962 A | 2/1992 |
| JP | H04-127063 A | 4/1992 |
| JP | H05-69350 A | 3/1993 |
| JP | H05-142232 A | 6/1993 |
| JP | H05-180847 A | 7/1993 |
| JP | 06-26808 A | 2/1994 |
| JP | H06-148198 A | 5/1994 |
| JP | 06-156730 A | 6/1994 |
| JP | 06-211306 A | 8/1994 |
| JP | 07-228345 A | 8/1995 |
| JP | 07-236838 A | 9/1995 |
| JP | H07-301637 A | 11/1995 |
| JP | H09-17848 A | 1/1997 |
| JP | H11-083865 A | 3/1999 |
| JP | H11-264828 A | 9/1999 |
| JP | H11-304812 A | 11/1999 |
| JP | H11-326336 A | 11/1999 |
| JP | 2000-105243 A | 4/2000 |
| JP | 2000-105246 A | 4/2000 |
| JP | 2001-124786 A | 5/2001 |
| JP | 2001-240245 A | 9/2001 |
| JP | 2005-001055 A | 1/2005 |
| JP | 2005-249740 A | 9/2005 |
| JP | 2006-106008 A | 4/2006 |
| JP | 2007-309675 A | 11/2007 |
| JP | 2007-314262 A | 12/2007 |
| JP | 2007-322289 A | 12/2007 |
| JP | 2009-036643 A | 2/2009 |
| JP | 2009-062188 A | 3/2009 |
| JP | 2009-145188 A | 7/2009 |
| JP | 2009-300402 A | 12/2009 |
| JP | 2010-243310 A | 10/2010 |
| JP | 2010-271204 A | 12/2010 |
| JP | 2013-172009 A | 2/2013 |
| JP | 2013-190400 A | 9/2013 |
| SU | 685591 A1 | 9/1979 |
| WO | 1996036437 A1 | 11/1996 |
| WO | 2003/042048 A3 | 5/2003 |
| WO | 2007/024540 A1 | 3/2007 |
| WO | 2008/133708 A1 | 11/2008 |
| WO | 2009/002358 A1 | 12/2008 |
| WO | 2010/042722 A1 | 4/2010 |
| WO | 2012/170636 A1 | 7/2010 |
| WO | 2010/087303 A1 | 8/2010 |
| WO | 2010/129715 A1 | 11/2010 |
| WO | 2012/142250 A1 | 10/2012 |
| WO | 2012/158541 A1 | 11/2012 |
| WO | 2013/152089 A1 | 10/2013 |
| WO | 2013/169778 A1 | 11/2013 |
| WO | 2013/177087 A2 | 11/2013 |
| WO | 2013/177163 A1 | 11/2013 |
| WO | 2014/059134 A1 | 4/2014 |
| WO | 2014/071214 A1 | 5/2014 |
| WO | 2015/104263 A2 | 7/2015 |

\* cited by examiner

STORAGE MODULE, METHOD OF OPERATING A LABORATORY AUTOMATION SYSTEM AND LABORATORY AUTOMATION SYSTEM

CROSS-REFERENCE TO RELATED APPLICATIONS

This application is a continuation of PCT/EP2016/065605, filed Jul. 1, 2016, which is based on and claims priority to EP 15175101.3, filed Jul. 2, 2015, which is hereby incorporated by reference.

BACKGROUND

The present disclosure relates to a storage module for a laboratory automation system, to a method of operating a laboratory automation system and to a laboratory automation system.

Laboratory automation systems can be used in order to provide for a partial or full automation of a laboratory. For that purpose, a laboratory automation system typically comprises a number of laboratory stations and a laboratory sample distribution system. Such laboratory sample distribution systems provide for a high throughput and for reliable operation.

Typical laboratory sample distribution systems are adapted to transport samples to be analyzed to the laboratory stations and away from the laboratory stations. However, it is common that reagents, disposables, labels or other items needed by the laboratory stations are provided to them externally, for example by manual operation or by separate supply means. This requires additional effort and high storage capacity.

Therefore, there is a need for a laboratory automation system that is able to further integrate and/or optimize supply of items to laboratory stations.

SUMMARY

According to the present disclosure, a storage module for a laboratory automation system is presented. The laboratory automation system can comprise a plurality of laboratory stations and a laboratory sample distribution system. The laboratory sample distribution system can comprise a number of sample container carriers. The sample container carriers can be adapted to carry one or more sample containers. The sample containers can comprise samples to be analyzed by the laboratory stations. The laboratory sample distribution system can also comprise a transport plane. The transport plane can be adapted to support the sample container carriers. The laboratory sample distribution system can also comprise a driver. The driver can be adapted to move the sample container carriers on the transport plane. The laboratory sample distribution system can also comprise a control device. The control device can be configured to control the driver such that the sample container carriers can move over the transport plane along predetermined transport paths. The storage module can comprise a number of storage areas for storing items that are to be transported by the laboratory sample distribution system. The storage areas can be adapted to dispose the stored items to sample container carriers and/or to transport carriers. The transport carriers can be adapted to carry one or more items. The driver can be adapted to move the transport carriers on the transport plane. The control device can be configured to control the driver such that the transport carriers can move over the transport plane along predetermined transport paths. The storage module can be adapted to be attached to the laboratory sample distribution system.

In accordance with one embodiment of the present disclosure, a method of operating a laboratory automation system is presented. The laboratory automation system can comprise a plurality of laboratory stations, a laboratory sample distribution system and a storage module. The method can comprise detecting that at least one type of items is missing or is running short at one of the laboratory stations, in response to the detecting, disposing a number of such items from one of a number of storage areas of the storage module, and transporting the items to the laboratory stations using the laboratory sample distribution system.

In accordance with another embodiment of the present disclosure, a laboratory automation system is presented. The laboratory automation system can comprise a plurality of laboratory stations and a laboratory sample distribution system comprising a number of sample container carriers. The sample container carriers can be adapted to carry one or more sample containers. The sample containers can comprise samples to be analyzed by the laboratory stations. The laboratory sample distribution system can also comprise a transport plane, wherein the transport plane is adapted to support the sample container carriers, a driver, wherein the driver is adapted to move the sample container carriers on the transport plane, and a control device, wherein the control device is configured to control the driver such that the sample container carriers move over the transport plane along predetermined transport paths. The laboratory automation system can comprise a storage module attached to the laboratory sample distribution system and a process control unit. The process control unit can be configured to control the laboratory stations, the laboratory sample distribution system, and the storage module such that the above method is performed.

Accordingly, it is a feature of the embodiments of the present disclosure to provide for a laboratory automation system that is able to further integrate and/or optimize supply of items to laboratory stations. Other features of the embodiments of the present disclosure will be apparent in light of the description of the disclosure embodied herein.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
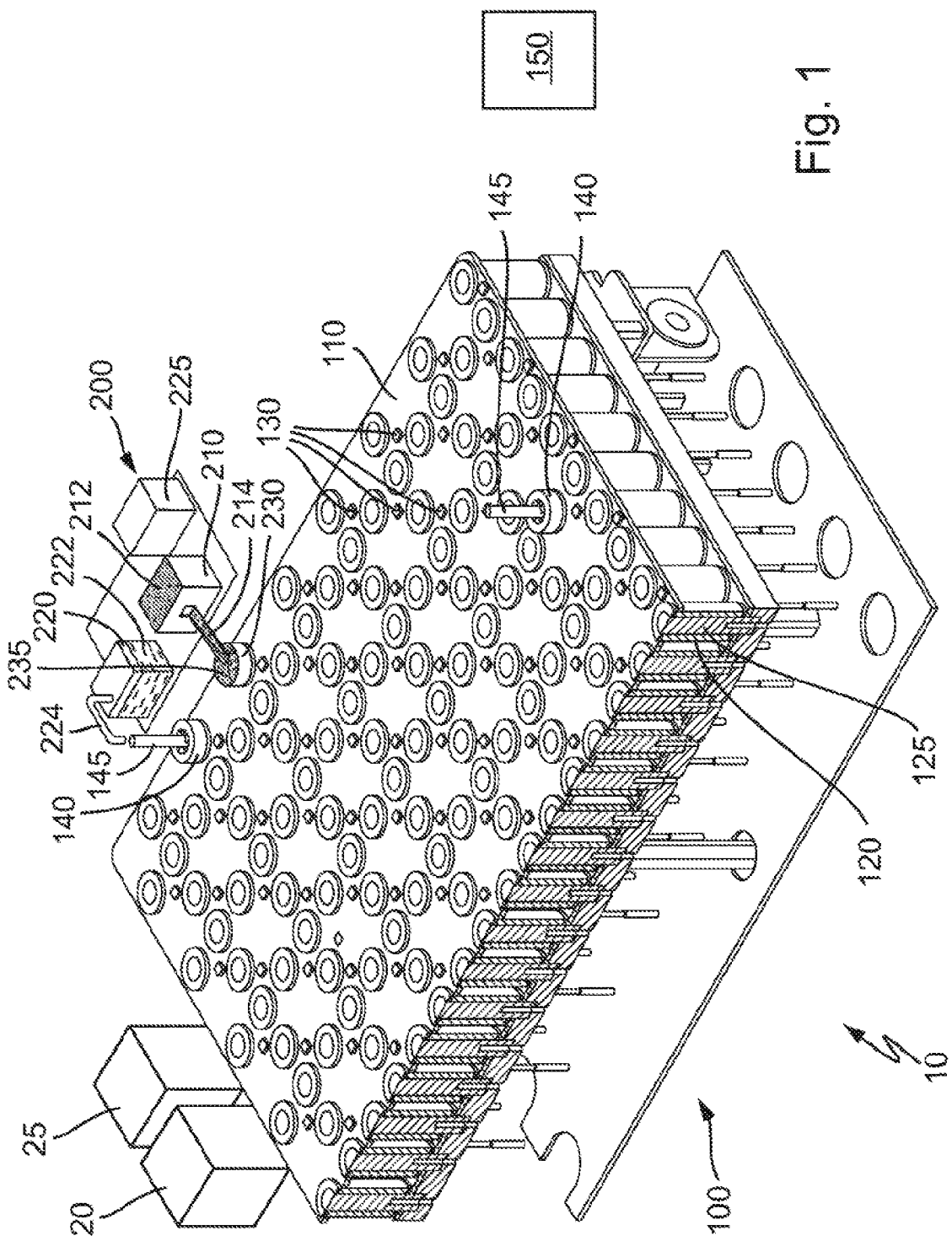
FIG. 1 illustrates a laboratory automation system comprising a storage module adapted to perform a method according to an embodiment of the present disclosure.

In the following detailed description of the embodiments, reference is made to the accompanying drawings that form a part hereof, and in which are shown by way of illustration, and not by way of limitation, specific embodiments in which the disclosure may be practiced. It is to be understood that other embodiments may be utilized and that logical, mechanical and electrical changes may be made without departing from the spirit and scope of the present disclosure.

A storage module for a laboratory automation system is presented. The laboratory automation system, which is not part of the storage module but is an element or arrangement within which the storage module can be operated, can comprise a plurality of laboratory stations and a laboratory sample distribution system.

The laboratory sample distribution system can comprise a number of sample container carriers. The sample container carriers can be adapted to carry one or more sample containers. The sample containers can comprise samples to be analyzed by the laboratory stations.

The laboratory sample distribution system can comprise a transport plane. The transport plane can be adapted to support the sample container carriers.

The laboratory sample distribution system can comprise a driver. The driver can be adapted to move the sample container carriers on (over) the transport plane.

The laboratory sample distribution system can further comprise a control device. The control device can be configured to control the driver such that the sample container carriers move over the transport plane along predetermined transport paths. Especially, the sample container carriers can move simultaneously and independently from one another along the predetermined transport paths.

With regard to the laboratory automation system with which the storage module can be operated, reference can be made to the description of an inventive laboratory automation system as described further below in this application.

The storage module can be adapted to be attached or adapted to be coupled to the laboratory sample distribution system. The storage module can comprise a number of storage areas for storing items that are to be transported by the laboratory sample distribution system.

The storage areas can be adapted to dispose the stored items to the sample container carriers, and/or to transport carriers. The sample container carriers can be the sample container carriers of the laboratory sample distribution system.

The transport carriers can be adapted to carry one or more of the stored or to be stored items. The driver can be adapted to move the transport carriers on the transport plane. The control device can be configured to control the driver such that the transport carriers can move over the transport plane along predetermined transport paths.

The storage module can provides for central storing of disposables, reagents, labels or other items that are needed by the laboratory stations. The storage module can be further adapted to seamlessly integrate with the laboratory sample distribution system such that the laboratory sample distribution system can be used to transport items or disposables from the storage module to the laboratory stations.

The sample container carriers can be available due to the normal functionality of the laboratory sample distribution system. Thus, these entities can also be used for transporting the stored items from the storage module to the laboratory stations or to other entities.

The transport carriers can typically be entities that can be specifically adapted to transport the items from the storage module to the laboratory stations or other entities. The transport carriers may typically not used to transport samples to, from or between the laboratory stations.

It can be noted that the transport carriers can, for example, be handled by the control device like the sample container carriers. For example, the transport carriers can be included in the conventional planning or distribution of transport paths, a task that is typically performed for the sample container carriers. However, it can be noted that it may be possible to specifically handle the transport carriers, for example taking into account different sizes or maximum speeds.

According to an embodiment, at least one handler can be assigned to the storage areas. The handler can be adapted to effect the disposal of the stored items to the sample container carriers or to the transport carriers by loading the items from the storage areas on/to the sample container carriers or on/to the transport carriers.

Such handlers can be used in order to extract stored items from the storage module in order to transport them to the laboratory stations. Manual intervention may typically not be necessary for that purpose.

According to an embodiment, the storage module can comprise a processor. The processor can be adapted to process the stored items, especially before they are transported by the laboratory sample distribution system.

The processing of the stored items may comprise shaking and/or mixing and/or heating and/or cooling the stored item and/or adding another item to the stored item and/or labeling or capping and/or uncapping the container of the stored item.

According to an embodiment, the processor can comprise a temperature control unit and/or a shaker unit and/or a mixer unit and/or an aliquoter unit and/or a label unit and/or a capping unit and/or a calibration substance preparation unit adapted to prepare a calibration substance. The temperature control unit may be adapted to control the temperature of the stored item by cooling or heating. The aliquoter may be adapted to aliquot the stored item. The label unit may label a container comprising the stored item. The capping unit may decap or recap a cap from/to the container comprising the stored item. The calibration substance preparation unit may prepare the calibration substance required for calibration of at least one of the laboratory stations.

According to a further embodiment, the processor can be adapted to plan, cause and/or control the processing of the stored items. A processing of the stored items may be required after a specific time period. The time period may be the time after an event, e.g., the last processing of the stored items or the last calibration of the laboratory stations. The processor may initiate the processing of the stored items.

The processor may be adapted to provide the prepared calibration substance to the laboratory sample distribution system. The laboratory sample distribution system can then be adapted to transport the prepared calibration substance to the laboratory station to be calibrated. The processor may be adapted to initiate a calibration process of a laboratory station.

A method of operating a laboratory automation system is presented. The laboratory automation system can comprise a plurality of laboratory stations, a laboratory sample distribution system and a storage module.

The method can comprise detecting that (if) at least one type of items is missing or is running short at one of the laboratory stations, in response to the detecting, disposing a number of such items from one of a number of storage areas of the storage module, and transporting the items to the laboratory stations using the laboratory sample distribution system.

Thus, the laboratory sample distribution system can be advantageously used in order to automatically supply reagents, disposables or other items to the laboratory stations. There may be no need to install separate supply systems and there may be further no need for manual intervention or control. It can be assured that the laboratory stations can be supplied with needed items.

According to an embodiment, the items can be transported by sample container carriers of the laboratory sample distribution system. According to another embodiment, the items can be transported by transport carriers.

According to an embodiment, the method can comprise detecting that at least one storage area is empty or is running short of items and, in response to the detecting, generating a signal indicating that the storage means should be filled and/or replaced.

This can allow not only for an automatic supply of the laboratory stations, but also for an automatic filling or replacement of the storage areas. Filling can, for example, mean that liquids or other items can be placed into a fixed container. Replacement can, for example, mean that a container storing liquids or other items can be replaced as a whole.

According to an embodiment, at least some of the items can be reagents, tubes, tips, pipetting heads, labels, cartridges comprising a set of reagents used in the laboratory stations and/or other consumables used by the laboratory stations.

According to an embodiment, at least some of the items can be calibration substances and/or substances required for preparation calibration substances.

According to an embodiment, at least some of the items can be liquids and can be transported using containers of the transport carriers. This can allow for an efficient distribution of liquids.

According to an embodiment, detecting that a type of items is running short can comprise detecting that a number or amount of such an item is less than about 10% of a maximum capacity. Such a value has been proven suitable in typical applications. It can be noted that also other values can be used such as, for example, 5%, 8%, 12% or 15%.

A laboratory automation system comprising a plurality of laboratory stations and a laboratory sample distribution system is presented. The laboratory sample distribution system can comprise a number of sample container carriers. The sample container carriers can be adapted to carry one or more sample containers. The sample containers can comprise samples to be analyzed by the laboratory stations. The laboratory sample distribution system can comprise a transport plane. The transport plane can be adapted to support the sample container carriers. The laboratory sample distribution system can comprises a driver. The driver can be adapted to move the sample container carriers on the transport plane. The laboratory sample distribution system can further comprise a control device. The control device can be configured to control the driver such that the sample container carriers move over the transport plane along predetermined transport paths.

The laboratory automation system can further comprise a storage module that is attached (coupled, assigned) to the laboratory sample distribution system.

The laboratory automation system can further comprise process control unit. The process control unit can be configured to control the laboratory stations, the laboratory sample distribution system and the storage module such that the above method can be performed. The process control unit can be different from the control device of the laboratory sample distribution system, but can also be implemented in the same device as the control device, for example in a control unit embodied as a microprocessor and corresponding program storage.

The sample containers can typically be designed as tubes made of glass or transparent plastic and typically can have an opening at an upper end. The sample containers can be used to contain, store and transport samples such as blood samples or chemical samples.

The transport plane can also be denoted as transport surface. The transport plane can support the sample container carriers, what can also be denoted as carrying the sample container carriers.

The driver can comprise electro-magnetic actuators. The electro-magnetic actuators can be typically built as electromagnets, having a solenoid surrounding a ferromagnetic core. These electro-magnetic actuators may be energized in order to provide for a magnetic field that can be used to move or drive the sample container carriers. For that purpose, at least one magnetically active device can be comprised in each sample container carrier, wherein the magnetically active device may be a permanent magnet. Alternatively or additionally, an electromagnet can be used. Accordingly, at least one magnetically active device can be comprised in each transport carrier, wherein the magnetically active device may be a permanent magnet. Alternatively or additionally, an electromagnet can be used.

The control device can typically be a microprocessor, a microcontroller, a field-programmable gate array, a standard computer or a similar device. In a typical embodiment, the control device can comprise a processor and storage. Program code can be stored in the storage in order to control the behavior of the processor when the storage code is executed on the processor. The same applies for the process control unit.

The sample container carriers and the transport carriers can typically be adapted to move in two dimensions on the transport plane. For that purpose, electro-magnetic actuators may be arranged in two dimensions below the transport plane. The electro-magnetic actuators may be arranged in a grid or matrix having rows and columns along which the electro-magnetic actuators are arranged.

According to an embodiment, the storage module can be an inventive storage module. With respect to the storage module, all embodiments and variations as discussed herein can be used.

According to an embodiment, the laboratory automation system can comprise a number of transport carriers adapted to carry one or more items. The driver can be adapted to move the transport carriers on the transport plane. The control device can be configured to control the driver such that the transport carriers can move over the transport plane along predetermined transport paths.

It can be noted that alternatively to the embodiment as described above with respect to the driver having electromagnetic actuators also self-driving transport carriers or sample container carriers can be used. For example, such transport carriers or sample container carriers can have wheels propelled by motors and/or being controllable with respect to a respective angle in order to control movement of the respective carrier. Sample container carriers can also be equipped with means for determining the respective position.

The laboratory stations can, for example, be pre-analytical, analytical and/or post-analytical (laboratory) stations, and a laboratory sample distribution system as described above can be adapted to transport the sample container carriers and/or sample containers between the stations. The stations will be arranged adjacent to the laboratory sample distribution system.

Pre-analytical stations may be adapted to perform any kind of pre-processing of samples, sample containers and/or sample container carriers.

Analytical stations may be adapted to use a sample or part of the sample and a reagent to generate a measuring signal, the measuring signal indicating if and in which concentration, if any, an analyte exists.

Post-analytical stations may be adapted to perform any kind of post-processing of samples, sample containers and/or sample container carriers.

The pre-analytical, analytical and/or post-analytical stations may comprise at least one of a decapping station, a recapping station, an aliquot station, a centrifugation station, an archiving station, a pipetting station, a sorting station, a tube type identification station, a sample quality determining station, an add-on buffer station, a liquid level detection station, and a sealing/desealing station.

Referring initially to FIG. 1, FIG. 1 shows a laboratory automation system 10. The laboratory automation system 10 can comprise a laboratory sample distribution system 100, a first laboratory station 20, a second laboratory station 25 and a storage module 200. The laboratory stations 20, 25 and the storage module 200 can be operatively connected to the laboratory sample distribution system 100. It can be noted that the two shown laboratory stations 20, 25 are only shown exemplarily and that typical laboratory automation systems 10 can have more than two laboratory stations.

The laboratory sample distribution system 100 can comprise a transport plane 110. Below the transport plane 110, a plurality of electro-magnetic actuators 120 can be provided. Each electro-magnetic actuator 120 can comprise a ferromagnetic core 125.

Over the transport plane 110, a plurality of position sensors 130 can be distributed. These position sensors 130 are embodied as Hall sensors.

On the transport plane 110, sample container carriers 140 can move. For exemplary purposes, there are shown two sample container carriers 140, each carrying a respective sample container 145. It can be noted that these two sample container carriers 140 are shown only exemplarily and that typical laboratory automation systems 10 can comprise more than two sample container carriers.

Each sample container carrier 140 can comprise a permanent magnet that is not visible in FIG. 1. Thus, the sample container carriers 140 can be driven by magnetic fields generated by the electro-magnetic actuators 120.

The sample distribution system 100 can further comprise a control device in the form of a control unit 150 that can be operatively connected to the electro-magnetic actuators 120 and to the position sensors 130. Thus, the control unit 150 can drive the electro-magnetic actuators 120 such that they can generate respective magnetic fields in order to propel the sample container carriers 140 and to propel transport carriers 230 along respective transport paths. Further, the control unit 150 can monitor the position of the sample container carriers 140 and the position of the transport carriers 230 by the position sensors 130. The control unit 150 can also act as a process control unit to control the entire laboratory automation system 10.

The storage module 200 can comprises a first storage area in the form of a first container 210, a second storage area in the form of a second container 220 and a processor 225. The processor 225 may comprise a calibration substance preparation unit and/or a temperature control unit. The first container 210 can be adapted to store a pulverized item 212, wherein the second container 220 can be adapted to store a liquid item 222. The temperature control unit can be adapted to heat or cool the item 212 and/or the item 222. The items 212, 222 can be used by the laboratory stations 20, 25 during analyzing of samples and/or during calibration.

The calibration substance preparation unit may be adapted to prepare a calibration substance, e.g. by mixing the items 212 and 222. The calibration substance may be used by the laboratory stations 20 and 25 for calibration purposes without any further modification.

The first container 210 can comprise a first handler in the form of a slide 214. By the slide 214, the first item 212 can be disposed on a carrier standing on the transport plane 110 in a specific position besides the storage module 200.

For transporting the first item 212, the transport carrier 230 can be provided on the transport plane 110. The transport carrier 230 can also comprise a permanent magnet and can be handled by the control unit 150 as if it would be a sample container carrier 140. However, the transport carrier 230 may not be adapted to transport a sample container 145, but can have a recess 235 in which the first item 212 can be stored. Thus, the first item 212 can be transported to the laboratory stations 20, 25 by the transport carrier 230.

The second container 220 comprises a second handler in the form of a standpipe 224. The standpipe 224 can have a height such that a sample container 145 contained in a sample container carrier 140 can be placed below it. This can allow a filling of the sample container 145 with the liquid second item 222. Thus, the second item 222 can be transported to the laboratory stations 20, 25 using sample container carriers 140 carrying sample containers 145.

The storage areas 200 in general can provide for a central storage of items 212, 222 such that no further supply may be required for the laboratory stations 20, 25. It can allow further to automate replacement of items in the laboratory stations 20, 25, because the laboratory stations 20, 25 can easily report to the control unit 150 that a specific item is running short or that calibration is required, and refilling or the preparation of the item 212, 222 can easily be accomplished by processing and/or disposal of the specific item 212, 222 at the storage module 200 and by transporting the specific item 212, 222 to the respective analyzing station 20, 25. For this purpose, the sample distribution system 100 can be used without further modification.

It can be noted that the two items 212, 222 are only shown exemplarily in the embodiment and that in a typical laboratory automation system 10, more than two items can be provided to the laboratory stations 20, 25. This can be accomplished in a similar way.

Figure 2:
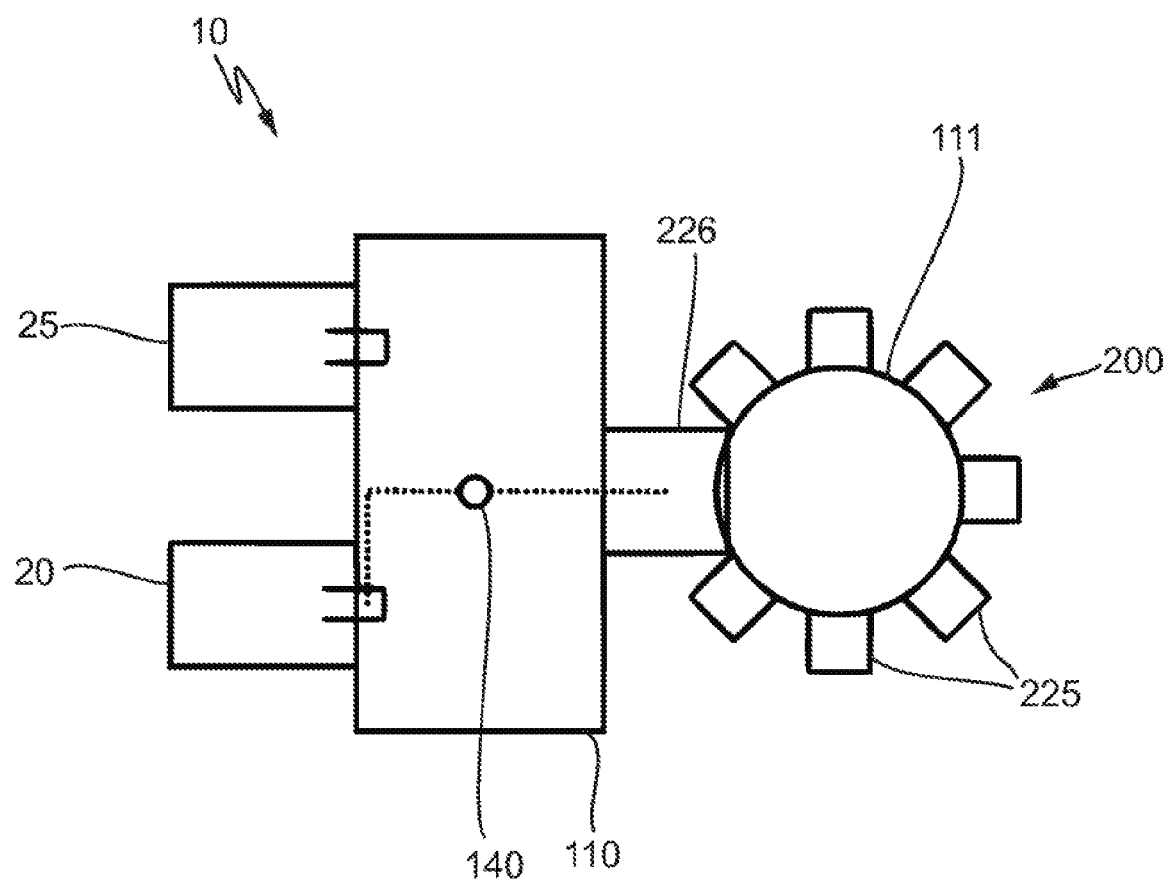
FIG. 2 illustrates schematically a laboratory automation system comprising a storage module adapted to perform a method according to another embodiment of the present disclosure.

FIG. 2 schematically shows a further embodiment of the laboratory automation system 10. The laboratory automation system 10 can comprise the laboratory sample distribution system 100, the first laboratory station 20, the second laboratory station 25 and the storage module 200.

According to this embodiment, the storage module 200 can comprise a number (e.g., 7) of processor 225, e.g., incorporating a temperature control unit and/or a shaker unit and/or a mixer unit and/or an aliquoter unit and/or a label unit and/or a capping unit and/or a calibration substance preparation unit adapted to prepare a calibration substance. The storage module 200 can further comprise an internal transfer unit 111 e.g., for transporting substances required for the preparation of the calibration substance to a specific processor 225 forming the calibration substance preparation unit. The internal transfer unit 111 may be a revolving transfer machine, a carousel machine or may use a transport mechanism corresponding to the laboratory sample distribution system 100.

The storage module 200 can further comprise a transfer unit 226 for filling of a sample container with the processed calibration substance. The sample container can be contained in the sample container carrier 140. The transfer unit 226 may use a transport mechanism corresponding to the laboratory sample distribution system 100.

Thus, the processed calibration substance may be transported to the laboratory station 20 and/or to the laboratory station 25 for calibration using the sample container carriers 140.

It is noted that terms like "preferably," "commonly," and "typically" are not utilized herein to limit the scope of the claimed embodiments or to imply that certain features are critical, essential, or even important to the structure or function of the claimed embodiments. Rather, these terms are merely intended to highlight alternative or additional features that may or may not be utilized in a particular embodiment of the present disclosure.

Having described the present disclosure in detail and by reference to specific embodiments thereof, it will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these preferred aspects of the disclosure.

We claim:

1. A laboratory automation system, the laboratory automation system comprising:
   a plurality of laboratory stations;
   a laboratory sample distribution system comprising a number of sample container carriers, wherein the sample container carriers are configured to carry one or more sample containers, wherein the sample containers comprise samples to be analyzed by the laboratory stations, a transport plane, wherein the transport plane is configured to support the sample container carriers, a driver, wherein the driver is configured to move the sample container carriers on the transport plane, and
   a control device, wherein the control device is configured to control the driver such that the sample container carriers move over the transport plane along predetermined transport paths;
   a storage module attached to the laboratory sample distribution system, comprising
      a plurality storage areas configured for storing items that are to be transported by the laboratory sample distribution system, wherein the storage areas are configured to dispose the stored items to sample container carriers and/or to transport carriers, wherein the transport carriers are configured to carry one or more items, wherein the driver is configured to move the transport carriers on the transport plane, wherein the control device is configured to control the driver such that the transport carriers move over the transport plane along predetermined transport paths, a processor, wherein the processor is configured to process the stored items and wherein the processor comprises a calibration substance preparation unit configured to prepare a calibration substance,
      an internal transfer unit configured for transporting substances required for preparation of the calibration substance calibration substance preparation unit, and
   a transfer unit for filling of a sample container with the calibration substance; and
   a process control unit, wherein the process control unit is configured to control the laboratory stations, the laboratory sample distribution system, and the storage module and wherein the process control unit is configured to:
   detect that items are missing or are running short at one of the laboratory stations,
   in response to the detecting, dispose a number of such items from one of a number of storage areas of the storage module, and
   transport the items to the laboratory stations using the laboratory sample distribution system, wherein the items are at least one of reagents, tubes, tips, pipetting heads, labels, cartridges comprising a set of reagents used in the laboratory stations and/or other consumables used by the laboratory stations, wherein the items are transported by the sample container carriers of the laboratory sample distribution system.

2. The storage module according to claim 1, wherein handlers are assigned to the storage areas and wherein the handlers are configured to effect the disposal of the stored items to the sample container carriers or to the transport carriers by loading the items from the storage areas on the sample container carriers or on the transport carriers.

3. The storage module according to claim 1, wherein the processor is configured to plan and/or cause and/or control the processing of the stored items and/or is configured to cause disposal of the prepared calibration substance to the sample container carriers and/or to the transport carriers.

4. The laboratory automation system according to claim 1, further comprises,
   detecting that at least one storage area is empty or is running short of items stored by the storage areas; and
   in response to the detecting, generating a signal indicating that the storage areas should be filled and/or replaced.

5. The laboratory automation system method according to claim 1, wherein at least some of the items are liquids and are transported using containers of the transport carriers.

6. The laboratory automation system method according to claim 1, wherein the detecting that a type of items is running short comprises detecting that a number, or amount, of such an item is less than 10% of a maximum capacity.

* * * * *